Figures 1, 2, 3:
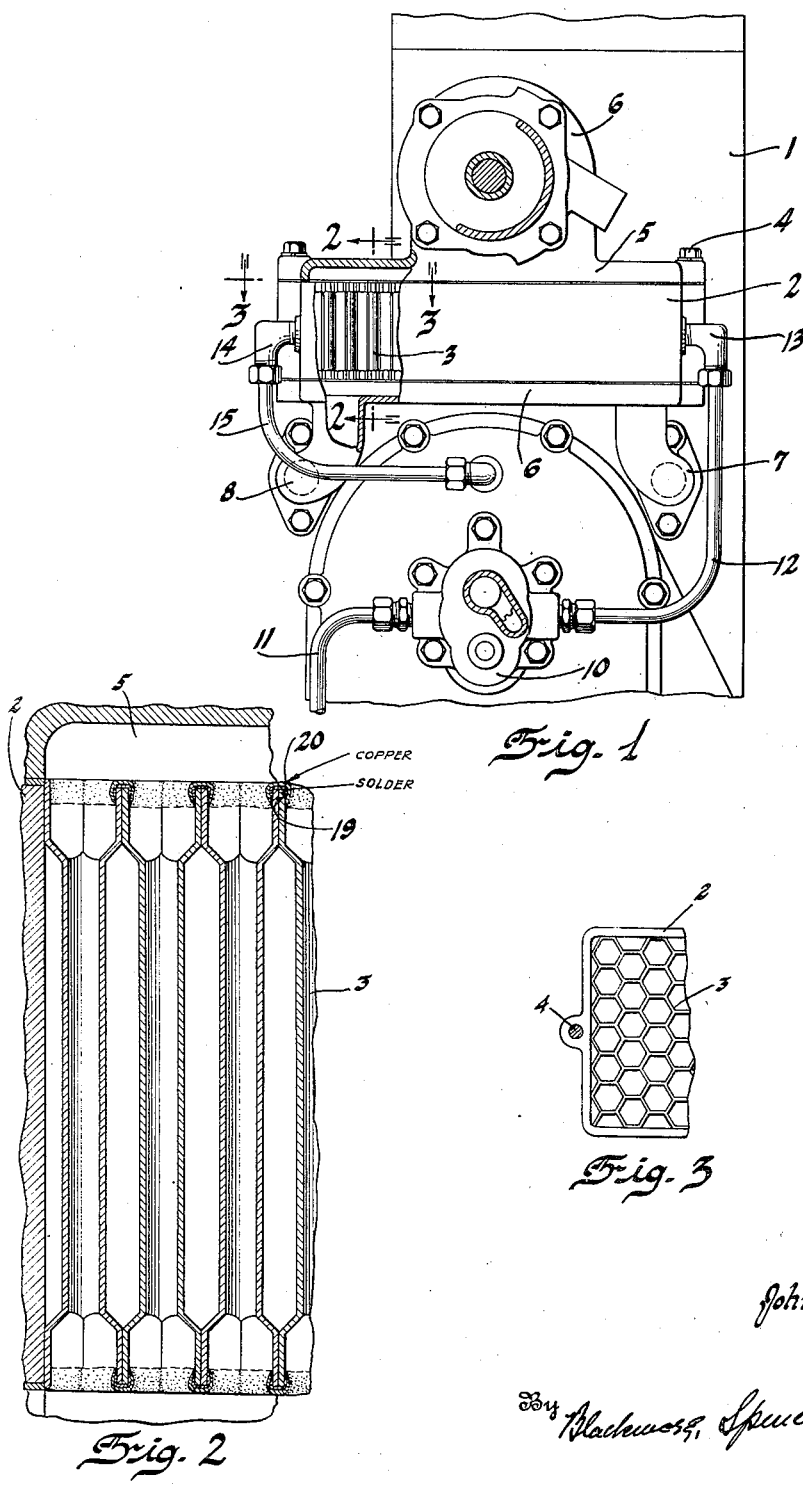

May 2, 1933. J. R. HOLMES 1,906,376
RADIATOR
Filed April 11, 1930

Inventor
John R. Holmes
By Blackmore, Spencer & Flint
Attorneys

Patented May 2, 1933

1,906,376

UNITED STATES PATENT OFFICE.

JOHN RALPH HOLMES, OF LOCKPORT, NEW YORK, ASSIGNOR TO HARRISON RADIATOR CORPORATION, OF LOCKPORT, NEW YORK, A CORPORATION OF NEW YORK

RADIATOR

Application filed April 11, 1930. Serial No. 443,386.

This invention has particular utility in connection with the manufacture of the heat dissipating unit of a radiator or cooler, and involves a reinforced joint or bond between cooperating elements or division walls that go to make up the assembly of fluid passages.

The cooling unit of an ordinary radiator forming a part of the circulating system of a water cooled internal combustion engine, as used on motor vehicles and the like, is usually made up of a number of division walls or partitions so related as to provide two fluid flow passages or sets of passages, one for the fluid from which heat is dissipated and the other for the fluid that is to absorb heat. These division walls generally consist either of a group of preformed sheet metal plates arranged in pairs with the marginal portions on opposite sides of the plates of each pair, in joined and sealed contact, to afford therebetween, flow passages for one of the fluids, and with adjacent pairs of plates in spaced relation to afford flow passages for the other fluid, or of a number of preformed sheet metal cartridges or tubes having extruded or expanded ends that are joined together to provide a unit wherein one fluid may flow through the intervening spaces between and around the outside of the several tubes and the other fluid may flow through the tubes. In either event, it is customary to join and seal the abutting edge portions of the sheet metal parts by solder. This represents conventional practice used for many years and which is entirely satisfactory when embod:ed in the ordinary cooling system of an engine where low pressures are involved.

Because of its high efficiency and comparatively low cost, attempts have been hertofore made to employ the same general sort of heat transference unit in high pressure cooling systems, such for example, as are sometimes incorporated in engines for heavy duty or aircraft work for reducing the temperature of either or both the lubricating medium for the moving parts and the cooling fluid that circulates through the engine jacket. Previous trials have not been successful and the main trouble experienced, lies in the weakness of the soldered bond between the sheet metal parts, it being found that the joints are not strong enough to withstand pressures for any appreciable length of time. The pressure on the fluid soon ruptures and breaks down the joint and leakage then occurs.

To overcome the difficulty and to provide an improved and stronger leak-proof connection between the parts which will be capable of resisting rupture, by reason of high pressures, is one of the primary objects of the present invention.

Another object is to provide an improved method for forming a reinforced joint and to this end the invention contemplates the assembly of the parts according to common practice and then after the parts are soldered in the usual fashion, subjecting the soldered joint to a metal depositing process to apply thereover a reinforcing coating. The reinforcement resulting from an electroplated coating of copper over a soldered joint, will enable the joint to withstand a pressure estimated at ten times that of the solder alone. Furthermore, it seems to be a natural tendency for the electrically deposited copper to build up or tree along the edges of metal being plated, and therefore, the thickest part of the deposited metal will be on the extreme outer edges of the joined parts, giving added strength.

A preferred, but not necessarily the only embodiment of the invention, is illustrated in the accompanying drawing, wherein Figure 1 is a front elevation with parts in section, of an internal combustion engine having applied thereto an oil cooling system. Figure 2 is a sectional view taken on line 2—2 of Figure 1 and illustrates a cooling unit embodying joined parts reinforced in accordance with the present invention. Figure 3 is a fragmental end view of the radiating core unit as it would appear looking in the direction of the arrows on line 3—3 of Figure 1.

Referring to the drawing, the numeral 1 indicates a cylinder block of an internal combustion engine, jacketed in the usual fashion, for the circulation of water or other cooling medium and provided at its front end with an oil cooler housing 2, enclosing a heat radiating unit or core 3. The core 3, which may be made up in any suitable fashion, is shown in the present instance, as comprising a number of tubes having their opposite ends extruded and joined together as will be more fully referred to later. Removably secured, as by means of bolts 4 over the top of the housing 2, is a header or inlet tank 5, shown as having integrally formed thereon, a water pump housing 6. Cooled water from the outlet of the conventional radiator (not shown) that forms a part of the engine cooling circuit is delivered by the pump 6 to the header 5, from whence it flows through the tube assembly into the lower header or outlet tank 6, which is connected as by means of tubular extensions 7 and 8, with the water jackets in the cylinder block 1.

The oil pressure circulating system of the engine is shown as including an engine driven pump 10, having an intake conduit 11 leading from a sump in the engine crank case, and an outlet or delivery conduit 12, which is connected to an elbow fitting 13, associated with one side of the oil cooler to introduce hot oil from the pressure pump into the space between the tube assembly 3 for flow across the assembly to the outlet fitting 14 on the opposite side from whence it is forced through the conduit 15 to the engine bearings or parts to be lubricated. It will be understood that the heat from the oil flowing around the tubes will be transferred to the cooler water forced through the tubes by the pump that connects with the outlet from the usual cooling radiator. The arrangement described may be variously modified and the transference of heat takes place between fluids other than water and oil, the specific disclosure being merely for illustrative purposes.

In the enlarged sectional view, Figure 2, the cooler parts are disclosed in greater detail and the provision of fluid flow passages through and around the sheet metal tubes is clearly shown together with the bond between adjacent portions of the sheet metal parts. The joints or connections along the opposite marginal sides of the core are indicated as comprising a layer of solder 19 with a reinforcing coating therefor at 20. It will be understood, of course, that the term soldering includes also sweating, brazing, and the like, and that the metallic coating may consist of other than electroplated copper. Obviously also, the parts to be joined may be other than an assembly of tubing.

The first step in assembling the extruded tube type of core such as shown in the drawing, consists of grouping together a number of the tubes in a suitable fixture, so that the opposite ends, which are enlarged and preferably formed hexagonal in contour are fitted in close contact one with another. In the event the core unit is to be made up of spaced pairs of plates or preformed sheets, these parts are also grouped together in proper relation and held in a fixture or frame in the same manner. With the tubes or plates securely held in the fixture the marginal edges of the core stock are then dipped in solder which secures the parts together and seals their adjacent abutting parts. Thereafter the joints between the parts are subjected to a plating process and a coating of copper is preferably electrolytically deposited thereover. This coating of metal not only supplements the solder in making the leak-proof connection, but it naturally strengthens and materially reinforces the joint, whereby the joint parts are capable of withstanding pressures much higher than the ordinary soldered joint.

The joint made as described has been found to successfully meet the requirements in connection with radiators for the aircraft industry. Many airplane engines are now being designed and produced wherein cooling is accomplished thru the use instead of water, of a higher boiling point liquid, such for example that containing ethylene glycol. Because this liquid has the ability to absorb moisture from the air, especially when heated and with which it combines to form an acid that is more or less detrimental and destructive to the cooling system parts, it is desirable in order to preclude the hydroscopic action to maintain the system closed and air-tight, which condition results in internal pressures with liquid expansion. In such installations the radiator core structure is subjected to hardships, including not only the imposition of abnormal pressures, but also extreme high temperatures. Manufacturing specifications calling for a radiator to withstand approximately fifteen pounds pressure at an operating temperature of around three hundred degrees temperature Fahrenheit are not uncommon.

Ordinary soldered assemblies failing to meet such requirements, led among other things to the proposal of plating the radiator core material before soldering, for the purpose of producing a homogeneous structure having an abundance of strength under pressure and the capability of withstanding temperatures as high as three hundred and fifty degrees, with either the entire elimination of solder or, and preferably, the dipping of the plated core faces in the usual solder bath in order to fill up any porous spots in the plating. This expedient, however, was found not to be entirely satisfactory from a commercial and production standpoint, and further work resulted in the reversal of the process, to the effect that the core faces be dipped in solder in the usual manner and prior to the step of plating. The solder dip serves to fill the holes and cracks at the joints and acts as a seal, while the metal plating, deposited to cover and extend into the cells beyond the solder and on the adjacent metal of the core assembly, serves to completely conceal the solder, incidently augmenting its sealing effect, and provides in itself an effective tie or bond between the parts to be connected. Best results are secured when the plating operation is so controlled that the metal deposited is ductile since a brittle coating will not stand up properly.

Cores made up according to this procedure have stood severe tests, carrying for repeated and long intervals pressures of one hundred and fifty pounds at two hundred and fifteen degrees temperature without failure of any kind even when pressures were materially increased during tests to an extent where the core material would collapse or tear apart, the faces of the assembly were still in good condition, showing conclusively that the bond effected is stronger than the material composing the core structure.

I claim:

In a heat transfer unit for fluid pressure circulating systems, a series of partitions arranged with their marginal portions in side to side relation, a solder joint of substantially U-shape in cross section, exteriorly applied to said marginal portions so as to extend across the mating edges and inwardly beside the outer surfaces of said marginal portions, and an electrolytically deposited metal coating over the exterior surface of the U-shaped solder joint to strengthen the same.

In testimony whereof I affix my signature.

JOHN RALPH HOLMES.